US006707418B2

(12) United States Patent
Hassebrock et al.

(10) Patent No.: US 6,707,418 B2
(45) Date of Patent: Mar. 16, 2004

(54) CORRELATING SINGLE CONTINUOUS WAVE RADAR SPACE OBJECT OBSERVATION FOR INITIAL ORBIT DETERMINATION

(75) Inventors: Alan W. Hassebrock, Colorado Springs, CO (US); J. Wayne Porter, Colorado Springs, CO (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/193,763

(22) Filed: Jul. 12, 2002

(65) Prior Publication Data

US 2004/0008137 A1 Jan. 15, 2004

(51) Int. Cl.[7] ......................... G01S 13/00; G01S 13/58; G01S 13/08; G01S 21/26

(52) U.S. Cl. ....................... 342/189; 701/226; 342/113; 342/145; 342/146

(58) Field of Search ................................ 342/105, 107, 342/109, 113, 145, 146, 189, 351, 352, 358; 701/226

(56) References Cited

U.S. PATENT DOCUMENTS 5,491,645 A * 2/1996 Kennedy et al. ............ 701/215
5,525,995 A * 6/1996 Benner ........................ 342/90
6,192,322 B1 * 2/2001 Rafanelli et al. ........... 702/150

* cited by examiner

*Primary Examiner*—Thomas H. Tarcza
*Assistant Examiner*—Brian Andrea
(74) *Attorney, Agent, or Firm*—Baker & Hostetler LLP

(57) ABSTRACT

Correlating observations of objects in the sky to determine an orbit includes identifying an initially identified object, determining if the initially identified object will be identifiable again, and identifying a subsequently identified object. A determination is then made by comparing characteristics of the initially identified object with the subsequently identified object. If the object correlate to one another a path or orbit of the object can be determined using the characteristics of the initially identified object and the subsequently identified object.

18 Claims, 3 Drawing Sheets

300

| IDENTIFICATION DEVICE | RE-IDENTIFICATION DEVICE | DETERMINING DEVICE | PATH DETERMINING DEVICE |
|---|---|---|---|
| 302 | 304 | 306 | 308 |

CORRELATING SINGLE CONTINUOUS WAVE RADAR SPACE OBJECT OBSERVATION FOR INITIAL ORBIT DETERMINATION

FIELD OF THE INVENTION

The present invention relates generally to the detection of objects in the sky. More particularly, the present invention relates to determining an orbit of an object in the sky.

BACKGROUND OF THE INVENTION

In order to detect objects in the sky many different systems are used. However, one problem with these systems is that the orbit of the object identified can not be determined. One of the major shortcomings of these systems is that an orbit of an object can not be generated with angles only information. Similarly, an orbit of an object can not be generated with a single S-band radar observation. The present systems can only generate angles only information which is typically generated with a single S-band radar observation. Thus, since the path of an object can not be determined once an object is identified only minimal characteristics can be derived from the object.

Accordingly, it would be beneficial to be able to determine an orbit of an object using S-band radar observations.

SUMMARY OF THE INVENTION

It is therefore a feature and advantage of the present invention to determine an orbit of an object identified in space.

The above and other features and advantages are achieved through the use of a novel method for correlating observations. In accordance with one embodiment of the present invention, the method includes the steps of identifying an initially identified object, determining if the initially identified object will be identifiable again, and identifying a subsequently identified object. A determination as to whether the initially identified object is the same as the subsequently identified object is then made by comparing characteristics of the initially identified object with the subsequently identified object. In alternate embodiments of the invention, a path or orbit of the object is determined using the characteristics of the initially identified object and the subsequently identified object.

In accordance with another embodiment of the present invention, a system for correlating observations includes a means for identifying an initially identified object, a means for determining if the initially identified object will be identifiable again and a means for identifying a subsequently identified object. The invention further includes a means for determining if the initially identified object is the same as the subsequently identified object based on characteristics of the initially identified object and the subsequently identified object.

In accordance with another embodiment of the invention, an apparatus for correlating observations includes an identification device that identifies an object in the sky, and a re-identification device that determines if an initially identified object can be re-identified by the identification device during the next pass. The re-identification device is in communication with the identification device. The invention further includes a determining device that determines if the initially identified object is the same as the subsequently identified object based on characteristics of the initially identified object and the subsequently identified object. The determining device is in communication with the re-identification device.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

The present invention provides correlation of object observations for an initial orbit determination. More specifically, the present invention correlates single continuous wave radar space object observations for initial orbit determination.

In one embodiment of the invention, a first identified object is correlated to a subsequently identified object. Based on the characteristics of these identified objects, a determination can be made as to whether the initially identified object is the same as the subsequently identified object. The navel space surround system which is a UHF interferometry detection system only measures elevation and azimuth angles on space objects which penetrate a VHF continuous wave "fence". With the use of an S-band radar, the space object measurement will include range, range rate, and radar cross-sections in addition to elevation and azimuth angles. However, the space object orbit can not be generated with "angles only" information or with a single S-band radar observation. The present invention correlates two S-band radar observations separated by one earth revolution, which in turn allows the determination an initially orbit on newly detected space objects.

Figure 1:
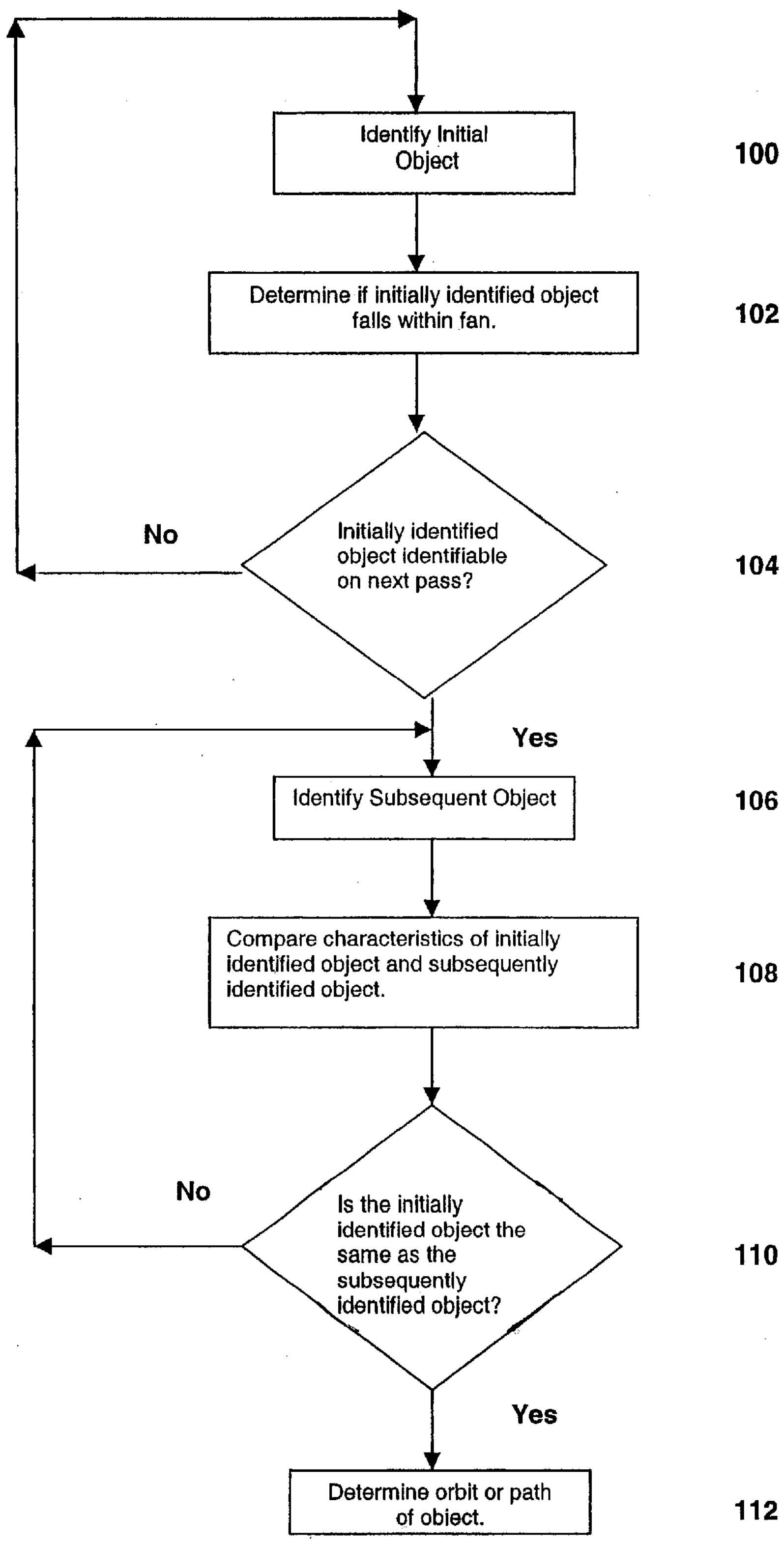
FIG. 1 is an illustration of the method steps of the present invention.

FIG. 1 illustrates the method steps of one embodiment of the invention. In step 100 an initial object is identified. In step 102 a determination is made as to whether the initially identified object falls within a continuous wave "fence" or fan. If the initially identified object does not fall within this "fence" or fan, the object will not be identifiable on the next pass. However, if the initially identified object does fall within the fan it will be identifiable on the next pass as illustrated in step 104. In step 106 a subsequently identified object is identified. In step 108 the characteristics of the first identified object is compared with the characteristics of the second identified object to determined if they are the same objects. In one embodiment of the invention, this can be done by comparing the time between observations, the height of the initially identified object compared to the height of the subsequently identified object, and also the longitudinal position of the initially identified object and the longitudinal position of the subsequently identified object.

In step 110 by comparing these characteristics, a determination is made as to whether the initially identified object is the same as the subsequently identified object. If the characteristics fall within certain thresholds a determination can be made that the initially identified object is the same as the subsequently identified object. Based on the determination made in step 112, an orbit of the object can be made based these characteristics.

Thus, the possibility of correlating two observations from the same radar on successive revolutions of an orbiting object can be done as described above. In making these determinations in one embodiment of the invention, it is assumed the first observation represents a UCT, so no preexisting information on the object's state exist for aiding in the process of determining the objects orbital parameters. Therefore, the data available as input to such algorithms are the radar parameters, including radar location, tilt, rotation, and a single measurement of range, azimuth, elevation, range rate, signal-to-noise ratio (SNR), and measured radar cross-section (RCS) at a specified time.

Figure 2:
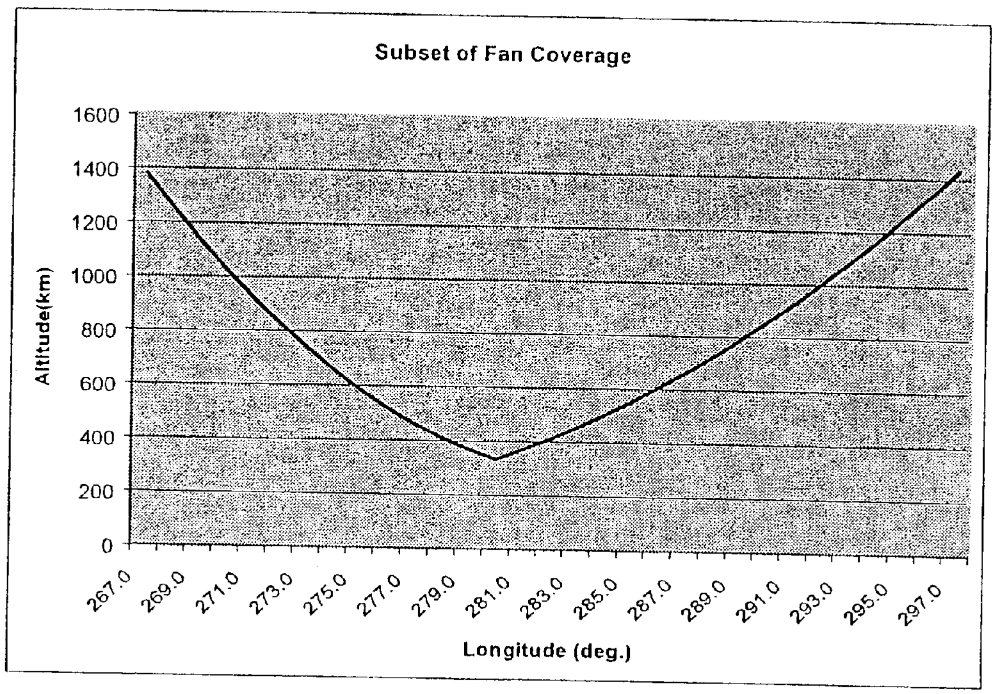
FIG. 2 illustrates a space region of the fan coverage where objects penetrating the space region of the fan will be identifiable on the next pass.

The first task of analysis in a single-site correlation is to identify that portion of the fan coverage in which the first observation must fall so that the object will penetrate the radar fan or "fence" again on the next pass. In one embodiment of the invention as illustrated in FIG. 2, the portion of fan coverage for re-identification represents 60% of the fan's total coverage. The subset of the fan coverage would relate to any objects falling within the cone illustrated in FIG. 2.

Except for small perturbations, satellite orbits are fixed in an inertial space coordinate system. Since the "fence" produced by the radar rotates with the earth, this creates a moving window for the satellite trajectory to pass through. The shape of this window is determined by the "fences"minimum elevation and the objects height, and differs in latitude excursion for each radar site. In one embodiment of the invention, no objects below 300 kilometers are candidates for this correlation scheme. Since the "fence" can rotate from 22 degrees to 29 degrees (in one period) for circular orbits or heights between 200 and 1,500 kilometers, an observation taken near the western edge of coverage will not penetrate the "fence" on the next revolution. In summary, only objects that pass through the indicated volume on the first revolution (i.e. within the cone of FIG. 2) can be expected to penetrate the "fence" on their next revolution.

In one embodiment of the invention, a radar generates a single vertical fan having a thickness of less than 0.15 degrees, and measures the scan angle and radar slant range of the object being detected. The scan angle is measured with respect to "directly overhead" down towards the horizon in both directions to an elevation of 15 degrees. The vertical fan is rotated with respect to an east to west orientation by 9 degrees in a clockwise direction.

In one embodiment of the invention, the radar location can be 33.1469 degrees north latitude (GEODETIC), and 268.9793 degrees east longitude. Directly under the fan on the surface of the earth is a locus of points forming a segment of a great circle. Changes in latitude (LAT) must be considered for development of correlation tests. In one embodiment of the invention, the radar site location and fan orientation, latitude is expressed as a monotonic function of longitude (LON), $$LAT=f(LON)$$

An excursion in longitude within the defined limits provides the range of latitude values needed. Staring with these basic radar measurements of slant range and scan angle in the topocentric coordinate space defined by the fan's latitude and longitude, translation to other coordinate spaces can be performed to determine required analysis parameters. One set of required parameters is the state vector. Unfortunately, determination of a complete state vector from the available radar measurements on a single penetration is not possible because there is no velocity information. Thus, the velocity estimation assumes the satellite path to be a ballistic orbit. Then a position time relationship of astrodynamic functions can be used. Once the state vector has been estimated, the period is calculated from these parameters. The time to return for the second fan penetration is essentially one period. The difference in longitude between the two passes is a function of the earth's rotation rate and the elapsed time (one period).

A number of simulations using estimated state vectors can be executed. Fan penetration positions can be translated to ECI Cartesian space and height/longitude space. The fan penetrations can be extended over the full coverage of the fan. Each of the first penetrations can be advanced one orbital period and the radar measurement of the second fan penetration to be observed. To become a candidate for correlation, both penetrations should be within the scan angle limits. Near the edges of acceptability, the granularity in changing LON for a given height can be reduced to hundreds of a degree. This procedure generates a loci of points defining west and east boundaries, where HS is a function of LON. To obtain functional representations, these points can be smoothed using polynomial filters of different degrees. Based on the residuals of the fits in some cases, second order functions are adequate.

For example, the following algorithms can be used for identification of fan penetrations that would have a high probability of being observed on the next pass:

$$DLO=|280.36-LON|$$

$$HE=400+30.545*DLO+2.40132*DLO^2 \text{(the east boundary)}$$

and $$HW=400+36.792*DLO+3.22793*DLO^2 \text{(the west boundary)},$$

then when LON>280.36 and HS>HE or LON<280.36 and HS>HW, a candidate has been identified.

Once it has been determined that an object falls within a fan and can be re-identified, other constraints must be measured to determine whether the subsequently identified object is the same as the initially identified object. Other constraints must be used to determine this correlation such as threshold values for time, longitude, height and RCS can also be established.

In one embodiment of the invention, single-site correlation is done using tests on time, height and longitude. The applicable radar parameter for input to the correlation algorithms are the position measurements of range, azimuth, elevation and time of the two observations separated by one revolution. These are used to compute the Cartesian position vector X/Y/Z, which in turn provides height and the sub-satellite latitude and longitude. For the time test, a circular orbit is assumed so that the mean period can be estimated using the distance from the center of the earth as the semi-major access. Now the expected penetration time span can be estimated from the period. The lower bound for the penetration time assumes that the measured height is apogee and perigee is at 200 kilometers. The upper bound for the penetration time assumes the measured height is perigee and that apogee is 1,000 kilometer higher.

The second test is on height. For non-circular orbits, the change in height is associated with the change in the true anomaly. The true anomaly values for the two observations referenced to perigee do not vary much. Thus, thresholds of acceptable change in height can be easily determined.

The third test is on longitude. As the "fence" extends east and west from the radar site, the sub-satellite points under the "fence" to represent a segment of a great circle, so a longitude value within the "fence" corresponds to a unique latitude value. For near polar orbits, the measured longitude of the second detection is within one degree of the longitude of the first observation, when adjusted for time and the earth's rotation rate. These differences are not influenced by the 9 degree azimuth rotation of the "fence". The test case using a circular orbit at 700 kilometer altitude and 64 degree inclination, produce differences in longitude of 2.7 degrees when using this approach.

In the absence of velocity information on the observations, there is no basis for resolving closely spaced objects. Therefore, the occurrence of closely space object can be dismissed using the following estimation for flux density of satellite spatial distributions:

$$F=3.1*10^{-7}\text{objects/kilometer}^3$$

The correlation parameters selected for eliminating unacceptable pairings are time, height and longitude. The first step as previously discussed in determining these parameters involve obtaining the constants required for the correlation functions.

In one embodiment of the invention, estimates for the acceptable times between observations use the magnitude of the distance measured from the earth's center to the observation. For the lower boundary on time the observation is assumed to be apogee and the height of 200 kilometers is assumed to perigee. For the upper time boundary the observed height is assumed to be perigee and the apogee is assumed to be 1,000 kilometers higher. Using these limits a high percentage of the valid pairs will be accepted while a low percentage will be falsely dismissed.

This same population of apogee/perigee combinations is used to bound the height changes by simulating orbits with true anomaly between 0 and 180 degrees. All maximum height changes per change in true anomaly occur for true anomaly between 100 and 110 degrees or the image values of 250 to 260 degrees. Once the maximum change in height per change in true anomaly for various values of height is determined, the true anomaly changes between the thin crossing points must be determined. Due to change in slope of the LAT/LON curve, this value is a function of longitude.

The maximum change between longitude values is also a function of longitude. The longitude of the second observation is adjusted to account for the earth's rotation by $$LON_2=LON_2+WE*(t_2-t_1),$$

where WE=earth's rotation rate and t=ob time.

After the adjustment, the longitudes are differenced and compared to the acceptable limits established through simulation. The constants needed for this sequence of association/correlation algorithms can be determined through the simulations as described above.

The first correlation test is on observation time, and includes the limits for acceptable time between two observations, $t_2-t_1$. Given that $$DTOBS=t_2-t_1 \text{ and } HS=\text{height and kilometers (first observation)}$$

Then the time correlation test is passed if $$(83+0.02143*HS)<DTOBS<(95+0.022143*HS)$$

Candidate correlations passing the time test are then submitted to the second correlation test which is on height. The height test includes the limits for an acceptable difference in kilometers between heights of observation 1 (HS1) and observation 2 (HS2). If HS1 is less than 700 then the acceptable limit (DH1) is that is established by $$ALP=-0.007520, \text{ and}$$

$$DH1=92.145*(1.0-EXP(ALP(HS1-200)))$$

If HS1 is greater than or equal to 700, then DH1 is set to 90. Once the initial value of DH1 is established, it is adjusted for the longitude of the first observation (LON1) as follows:

$$DLON=LON1-270$$

$$DH1=DH1*(0.2+0.032*DLON)$$

When DH1 is greater than or equal to the absolute value of the height difference between the first and second observations (absolute of HS2−HS1), then the height test is passed.

Candidate correlation passing the height test are then tested for change in longitude. Given:

$$DLON=|(LON2+WE(t_2-t_1))-LON1|,$$

Then the longitude test passes when $$DLON<(1.6+0.115\times(LON1-265)).$$

In summary, these algorithms and tolerances can be used to determine the probability of correlation between two observations from successive revolutions of the same site if the first observation falls within the space within the fan. It can be estimated that the probability of correlation between the same object in the described area of interest is approximately 95%. This correlation will allow the building of a catalog of objects identified in space.

Once a correlation has been made between the initially identified object and the subsequently identified object, astrodynamic algorithms can be used to produce orbital elements and or state vectors from the two observations. After translation of the radar penetration parameters (scan angle and slant range at time t) into inertial Cartesian space (X/Y/Z at time t), algorithms can be used to determine orbital elements and/or complete state vectors with velocity. A two body solution known as the Lambert-Euler solution can be used to define orbital elements from two observations. Once the orbital elements are available, the path of the body is predicted for multiple orbits.

Figure 3:
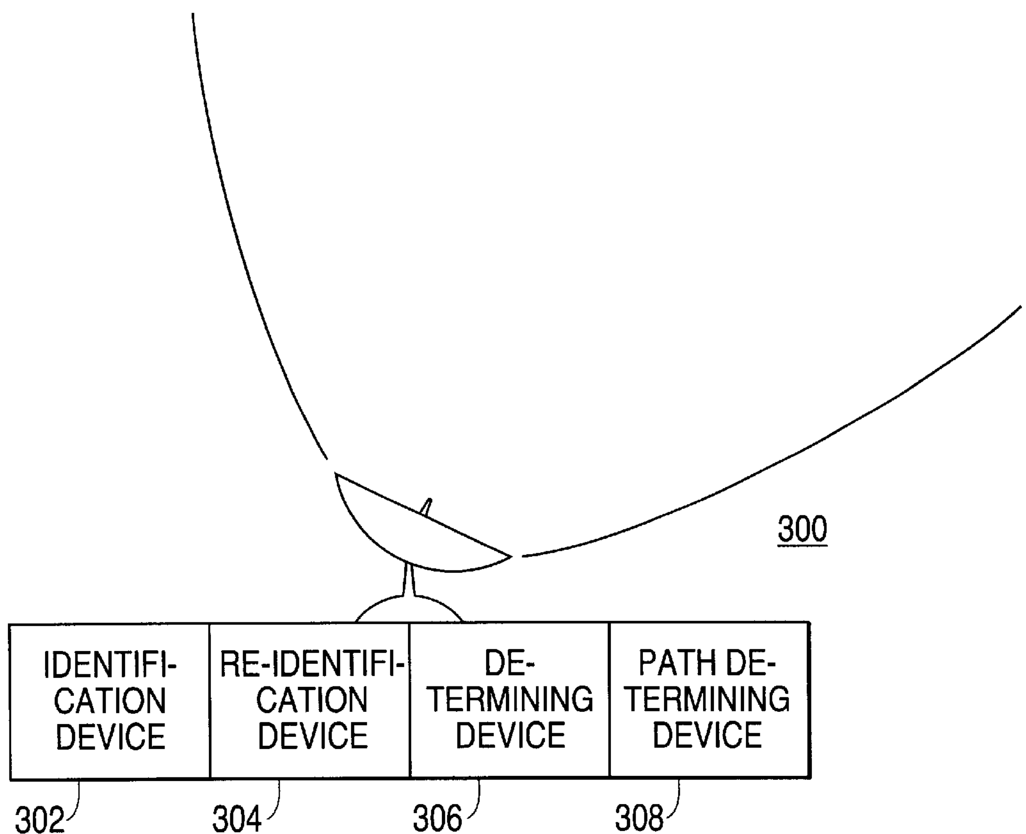
FIG. 3 is an illustration of the device of the present invention.

FIG. 3 is an illustration of a device for correlating observations of objects. The device 300 includes an identification device 302 which can be used to identify objects in the sky. Device 300 also includes a re-identification device 304 which will correlate or make a determination as to whether a first or initially identified object can be identified on the next pass. The re-identification device 304 creates a fan in the sky where. If an initially identified object falls within the fan it is determined that the initially identified object can be identified on the next pass. A determining device 306 is also included. The determining device 306 makes the determination as to whether an initially identified object correlates to a subsequently identified object. As previously discussed this can be done by evaluating characteristics of the initially identified object with the characteristics of a subsequently identified object. These characteristics can include factors such as time between observations, height and longitude of the initially identified object and the subsequently identified object. In one embodiment of the invention a path determining device 308 is included to determine the path of the object if it is determined that the initially identified objects correlates or is the same as the subsequently identified object. The path determining device 308 can operate in one embodiment of the invention by translating radar penetration parameters such as scan angle and slant range at a time t into inertial Cartesian space parameters X,Y,Z at time t. Algorithms such as the Lambert-Euler solution can used to define the orbital path of an object using these characteristic.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed:

1. A method for correlating observations comprising the steps of:

identifying an initially identified object;

determining if said initially identified object will be identifiable again;

identifying a subsequently identified object; and determining if said initially identified object is the same as said subsequently identified object based on characteristics of said initially identified object and said subsequently identified object;

wherein said step of determining if said initially identified object will be identifiable again comprises the step of generating a radar fan wherein if said initially identified object falls within said radar fan said initially identified object will be able to be identified again on the next pass.

2. The method as recited in claim 1 further comprising the step of determining a path for said initially identified object based characteristics of said initially identified object and said subsequently identified object.

3. The method as recited in claim 1 wherein said step of determining if said initially identified object will be identifiable again comprises the step of generating a vertical fan wherein if said initially identified object falls within said vertical fan said initially identified object will be able to be identified again on the next pass.

4. The method as recited in claim 1 wherein said step of determining if said initially identified object is the same as said subsequently identified object further comprises the step of using characteristics such as time, height and longitudinal position.

5. The method as recited in claim 1 wherein said step of determining if said initially identified object is the same as said subsequently identified object comprises the steps of:

determining if a time difference between identification of said initially identified object and said subsequently identified object falls within a specified range;

determining if a difference between a height of said initially identified object and said subsequently identified object fall within a specified range; and determining if a difference between a longitudinal position of said initially identified object and said subsequently identified object fall within a specified range.

6. The method as recited in claim 1 further comprising the steps of:

translating scan angle and slant range at time t said initially identified object and said subsequently identified object into inertial Cartesian space parameters (X/Y/Z at time t); and determining a path for said initially identified object based on said inertial Cartesian space parameters.

7. A system for correlating observations comprising:

a means for identifying an initially identified object;

a means for determining if said initially identified object will be identifiable again;

a means for identifying a subsequently identified object; and a means for determining if said initially identified object is the same as said subsequently identified object based on characteristics of said initially identified object and said subsequently identified object;

wherein said means for determining if said initially identified object will be identifiable again comprises a means for generating a radar fan wherein if said initially identified object falls within said radar fan said initially identified object will be able to be identified again on the next pass.

8. The system as recited in claim 7 further comprising a means for determining a path for said initially identified object based characteristics of said initially identified object and said subsequently identified object.

9. The system as recited in claim 7 wherein said means for determining if said initially identified object will be identifiable again comprises a means for generating a vertical fan wherein if said initially identified object falls within said vertical fan said initially identified object will be able to be identified again on the next pass.

10. The system as recited in claim 7 wherein said means for determining if said initially identified object is the same as said subsequently identified object further comprises a means for using characteristics such as time, height and longitudinal position to determining is said initially identified object is the same as said subsequently identified object.

11. The system as recited in claim 7 wherein said means for determining if said initially identified object is the same as said subsequently identified object comprises:

a means for determining if a time difference between identification of said initially identified object and said subsequently identified object falls within a specified range; and a means for determining if a difference between a height of said initially identified object and said subsequently identified object fall within a specified range; and a means for determining if a difference between a longitudinal position of said initially identified object and said subsequently identified object fall within a specified range.

12. The system as recited in claim 7 further comprising:

a means for translating scan angle and slant range at time t of said initially identified object and said subsequently identified object into inertial Cartesian space parameters (X/Y/Z at time t); and a means for determining a path for said initially identified object based on said inertial Cartesian space parameters.

13. An apparatus for correlating observations comprising:

a identification device that identifies an object in the sky;

a re-identification device that determines if an initially identified object can be re-identified by said identification device during a next pass, said re-identification device in communication with said identification device; and a determining device that determines if said initially identified object is the same as said subsequently identified object based on characteristics of said initially identified object and said subsequently identified object, said determining device in communication with said re-identification device;

wherein said re-identification device comprises a fan generator that generates a radar fan wherein if said initially identified object falls within said radar fan said initially identified object will be able to be identified again on the next pass.

14. The apparatus as recited in claim 13 further comprising a path determining device that determines a path for said initially identified object based characteristics of said initially identified object and said subsequently identified object.

15. The apparatus as recited in claim 13 wherein said re-identification device comprises a fan generator that generates a vertical fan wherein if said initially identified object falls within said vertical fan said initially identified object will be able to be identified again on the next pass.

16. The apparatus as recited in claim 13 wherein said re-identification device uses characteristics such as time, height and longitudinal position to determining if said initially identified object is the same as said subsequently identified object.

17. The apparatus as recited in claim 13 wherein said re-identification device comprises:

a time difference determiner that determines if a time difference between identification of said initially identified object and said subsequently identified object falls within a specified range;

a height difference determiner that determines if a difference between a height of said initially identified object and said subsequently identified object fall within a specified range, said height difference determiner in communication with said time difference determiner; and a longitudinal position determiner that determines if a difference between a longitudinal position of said initially identified object and said subsequently identified objects falls within a specified range, said longitudinal difference determiner in communication with said height difference determiner.

18. The apparatus as recited in claim 13 wherein said determining device further comprises:

a translator that translates scan angle and slant range at time to of said initially identified object and said subsequently identified object into inertial Cartesian space parameters (X/Y/Z at time t); and path determiner that determines a path for said initially identified object based on said inertial Cartesian space parameters, said path determiner in communication with said translator.

* * * * *